April 20, 1937. L. W. BLAU 2,077,391

DAMPED WAVE FILTER

Filed Sept. 8, 1934

Ludwig W. Blau Inventor

By W. F. Weigester Attorney

Patented Apr. 20, 1937

2,077,391

UNITED STATES PATENT OFFICE 2,077,391

DAMPED WAVE FILTER

Ludwig W. Blau, Houston, Tex., assignor to Standard Oil Development Company, a corporation of Delaware Application September 8, 1934, Serial No. 743,287

17 Claims. (Cl. 177—352)

This invention relates to improvements in damping mixed low and high frequencies in an electric circuit. More particularly it relates to an improved method and apparatus for eliminating high and low frequency waves originating in the circuit in reflection seismology.

In seismic prospecting by reflections it is customary to explode a charge of dynamite at or near the surface of the earth. Earth waves are created by the explosion which radiate outwardly from the shot-point. Earth wave detectors, such as seismographs, are set up in spaced relation to the shot-point to receive some of these waves. In reflection shooting the waves which it is desired to record are waves which travel substantially vertically downward from the shot-point to an earth stratum or cap rock and are reflected substantially vertically upward from the cap rock. Some of the waves are surface waves which travel substantially horizontally from the shot-point to the seismograph. The surface waves have a lower frequency than the relatively high frequency of the reflected waves. Also the surface waves have a relatively large amplitude. Consequently, the surface waves are detrimental to the appearance of reflection records and obliterate the identity of the reflections. The surface waves must be filtered out in order that the reflections may be recorded clearly and with sharp beginnings.

It is the object of this invention to eliminate the objectionable waves originating in the earth vibrations while simultaneously damping out high and low frequency oscillations originating in the filtering system. It is a further object to provide an electrical wave filter with sharp cut-off and with sufficient damping to permit of recording reflected waves which arrive very close together in point of time.

Other objects will be apparent from the specification and from the accompanying drawing in which latter—

Figure 1:
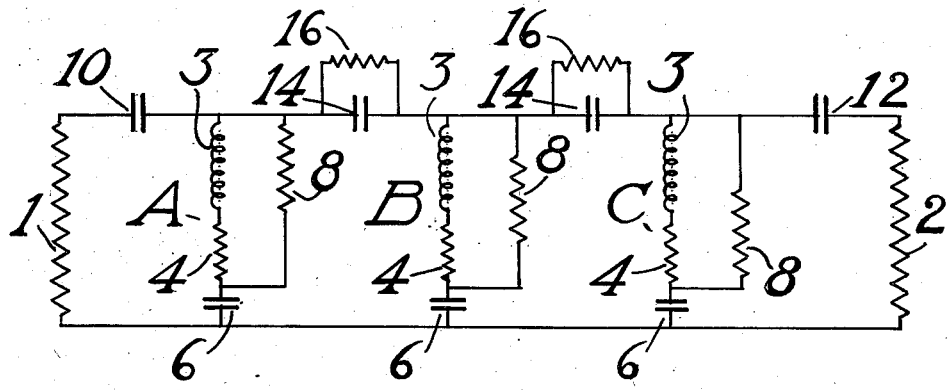
Figure 2:
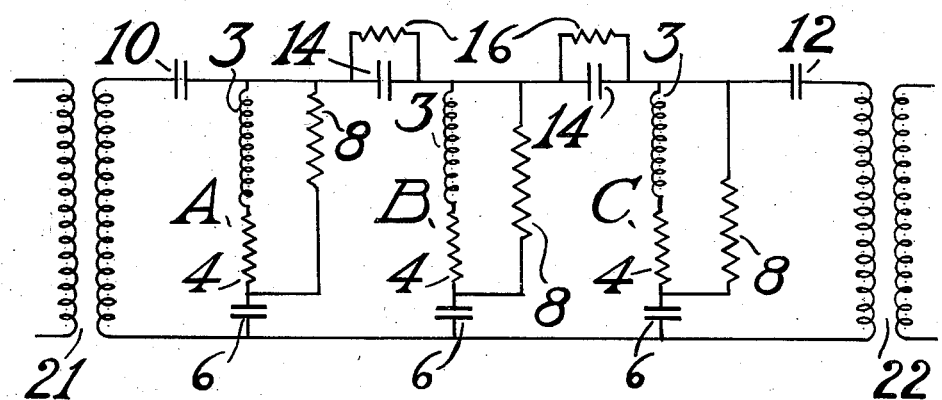
Figure 3:
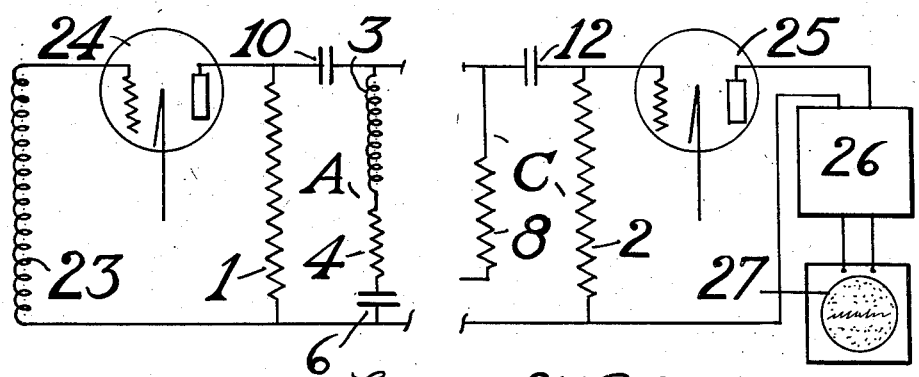

Fig. 1 is a diagrammatic representation of a preferred form of circuit; Fig. 2 is a diagrammatic representation of a modified form of circuit; and Fig. 3 is a diagrammatic representation of an arrangement of apparatus for use in reflection shooting.

Referring particularly to Fig. 1 of the drawing, reference numeral 1 designates an in-put resistance such as the resistance of an electrical seismograph. Numeral 2 represents an out-put resistance. An electric circuit connects the resistances. A plurality of parallal branches A, B, and C are provided in the circuit. Each branch includes an inductance 3, a resistance 4 and a condenser 6 connected in series. A resistance 8 for each branch is connected in parallel with the inductance 3 and the resistance 4, whereby high frequency oscillations originating in the circuit are eliminated. A condenser 10 is provided in the circuit between the resistance 1 and the branch A and a condenser 12 is provided in the circuit between the branch C and the out-put resistance 2. A condenser 14 is disposed in the circuit between each of the adjoining branches A, B and C. A resistance 16 is disposed in the circuit between adjoining branches A, B, and C in parallel with each of the condensers 14 whereby low frequency oscillations originating in the circuit are eliminated.

The elimination of low frequencies is accomplished as follows:

Such values of the inductance 3 and condenser 6 of branch A are selected that the combination resonates at 3 cycles. Similarly the corresponding combination of branches B and C are so adjusted that they resonate at 9 and 15 cycles respectively. The vector voltages across the condenser and inductance of each branch are out of phase and cancel out at resonance when the condenser is connected in series with the inductance. Therefore, the voltage drop across the combination of condenser 6, inductance 3 and resistance 4 of a branch A is very small at 3 cycles and would be zero if a coil having zero D. C. resistance could be made. The voltage drop across the condenser 10, the capacity of which is of the order of 0.1 microfarad is very large at 3 cycles. Consequently, a frequency of 3 cycles is substantially eliminated by the combination of condenser 10, together with the condenser 6, inductance 3 and resistance 4 of branch A since only the drop across the condenser 6, inductance 3 and resistance 4 is impressed upon the next section of the filter.

By way of example, the condenser 10 may have a capacity of 0.1 microfarad. The condenser 6 may have a capacity of 4 microfarad. The inductance 3 may be 625 henries while the resistance 4 of the choke coil may be 8,000 ohms. At 3 cycles, therefore, the drop across the branch A is $$\frac{8,000}{535,000},$$

approximately of the drop across the in-put resistance 1.

The combination of condenser 6 and inductance 3 of branch B tunes at 9 cycles; hence at this frequency the drops across condenser 6 and inductance 3 of branch B cancel, leaving only the drop across the resistance 4 of branch B, so that at 9 cycles there can again be eliminated all but one or two parts per 1,000 of the energy and but little energy of frequency four or five will be passed. The branch C functions in a similar manner to that described for branches A and B.

The circuit forms an oscillatory system which would resonate without the damping resistances 8 and 16 at such a frequency as to interfere with the recording of reflections. The origin of the frequency being in the circuits and not coming from the earth would cause the seismogram to be distorted. Such oscillations may be sustained for example for as long as 0.1 second. It frequently happens that 2 reflections arrive within 0.02 second of each other. It is evident, therefore, that the oscillations in the apparatus must be damped to a shorter time than 0.02 second.

It has previously been very difficult to damp an electrical network of the type described above in the ordinary way by the introduction into the network of resistors in series. I have found that if a resistance 8 is connected in parallel with a choke coil having the inductance 3 and resistance 4, the damping resistor 8 provides very efficacious damping at high frequencies while furnishing very little damping at low frequencies. On the other hand resistances designated 16 connected in parallel with the condenser 14 provide very efficacious damping at low frequencies and little damping at high frequencies. It is possible, therefore, by means of such resistors in parallel with choke coils or with condensers as shown to damp such an electrical network as shown very efficiently and at all frequencies.

By way of explanation the reactance of a coil increases directly with frequency and is equal to $L\omega$ where $L$ is the inductance and $\omega$ is $2\pi$ times the frequency. Connecting a damping resistance such as 8 in parallel with such a coil, therefore, prevents the increase of the reactance across the coil to a value higher than the value of the resistance. Such a damping resistance, therefore, has the greatest effect at high frequencies.

The reactance of a condenser such as 14 is high at low frequencies and is proportional to the reciprocal of $2\pi$ times the frequency, and infinity at zero frequency. A damping resistor such as 16 connected in parallel with such a condenser will, therefore, prevent the increase of reactance of the condenser, as the frequency decreases, to a value greater than the value of the damping resistance. The damping is, therefore, greatest at the low frequencies and has practically no effect at the high frequencies.

The values of the in-put resistance 1, the out-put resistance 2 and the condensers 10, 12 and 14 are preferably so chosen that they will reduce the vibrations of frequencies greater than 20 cycles very little. Preferably the capacities of the condensers 14 are made equal to each other; then the capacities of condensers 10 and 12 are made approximately twice as large as the capacities of the condensers 14. Alternately the capacities of these condensers can be varied and some of the advantages of the inventions will be retained. Also the branches A, B, and C can be tuned at progressively decreasing cycles.

Since the low frequencies have greater energies it is desirable to eliminate them first. Where the low frequencies are weak, a lesser number of branches may be necessary as, for example, only one branch may be needed to eliminate the low frequencies. When the low frequencies are exceptionally strong it may be necessary to add additional branches in the circuit.

Fig. 2 shows a variation in the circuit illustrated in Fig. 1 and like parts are indicated by like reference numerals. In this circuit reference numeral 21 designates an in-put transformer and 22 designates an out-put transformer. The branches A, B, and C are connected in parallel across the circuit. Each branch includes an inductance 3, a resistance 4, and a condenser 6 connected in series. A damping resistance 8 is provided for each branch connected in parallel with the inductance 3 and the resistance 4. Condensers 10, 12, and 14 are connected in the circuit between the in-put transformer 21 and the branch A, between the out-put transformer 22 and the branch C, and between each of the adjoining branches A, B, and C respectively. A resistance 16 is disposed in the circuit between adjoining branches in parallel with each of the condensers 14.

Referring particularly to Fig. 3 a preferred arrangement of apparatus for reflection shooting is shown in which reference numeral 23 designates the coil of a magneto-electrical seismograph such as is described in the copending application Serial #626,132 of Ludwig W. Blau et al. entitled "Seismograph" filed July 29, 1932 and the magneto-electrical seismograph described in Patent No. 2,018,756, of Ludwig W. Blau et al. filed August 18, 1932 entitled "Compound seismograph." Alternatively other electrical seismographs such as a single condenser, double condenser, hot-wire, piezo electric, or any other electric seismograph can be used.

The coil 23 is connected across the grid and filament of a vacuum tube 24 which may be a three electron or screen grid tube. The vacuum tube 24 is connected to the in-put resistance 1 of the circuit previously described in connection with Fig. 1. The out-put resistance 2 of the circuit is connected to a vacuum tube 25 which in turn is connected to an amplifier 26. The amplifier 26 is connected to an oscillograph 27 which records the seismogram. In using the circuit illustrated in Fig. 2 the transformers 21 and 22 are connected in place of the resistances 1 and 2 respectively of Fig. 3.

Various changes and alternative arrangements may be made within the scope of the appended claims in which it is my intention to claim all novelty inherent in my invention as broadly as the prior art permits.

I claim:

1. A filter comprising an electrical circuit having a plurality of parallel branches each with an inductance, a resistance and a condenser connected in series, a resistance for each branch connected in parallel with the inductance and resistance whereby high frequency oscillations originating in the circuit are eliminated, and a condenser in the circuit between adjoining branches.

2. A filter comprising an electric circuit having a plurality of parallel branches each with an inductance, a resistance and a condenser connected in series, a resistance for each branch connected in parallel with the inductance and resistance whereby high frequency oscillations originating in the circuit are eliminated, a condenser in the circuit between adjoining branches, and a resistance in the circuit between adjoining branches in parallel with each of the last mentioned condensers whereby low frequency oscillations originating in the circuit are eliminated.

3. A filter comprising an in-put resistance, an out-put resistance, an electric circuit connecting the resistances, a plurality of parallel branches in the circuit, each branch including an inductance, a resistance and a condenser connected in series, and a resistance for each branch connected in parallel with the inductance and resistance whereby high frequency oscillations originating in the circuit are eliminated.

4. A filter comprising an in-put resistance, an out-put resistance, an electric circuit connecting the resistances, a plurality of parallel branches in the circuit each branch including an inductance, a resistance and a condenser connected in series, a condenser in the circuit between adjoining branches, and a resistance in the circuit between adjoining branches in parallel with each of the last mentioned condensers whereby low frequency oscillations originating in the circuit are eliminated.

5. A filter comprising an in-put resistance, an out-put resistance, an electric circuit connecting the resistances, a plurality of parallel branches in the circuit, each branch including an inductance, a resistance and a condenser connected in series, a resistance for each branch connected in parallel with the inductance and resistance whereby high frequency oscillations originating in the circuit are eliminated, a condenser in the circuit between adjoining branches, and a resistance in the circuit between adjoining branches in parallel with each of the last mentioned condensers whereby low frequency oscillations originating in the circuit are eliminated.

6. A filter comprising an input transformer, an out-put transformer, an electric circuit connecting the transformers, a plurality of parallel branches in the circuit, each branch including an inductance, a resistance, and a condenser connected in series, and a resistance for each branch connected in parallel with the inductance and resistance whereby high frequency oscillations originating in the circuit are eliminated.

7. A filter for eliminating low frequency waves, comprising an in-put resistance, an out-put resistance, an electric circuit connecting the resistances, a plurality of parallel branches in the circuit, each branch including an inductance, a resistance and a condenser connected in series, a resistance for each branch connected in parallel with the inductance and resistance whereby high frequency oscillations originating in the circuit are eliminated, a condenser in the circuit between adjoining branches, a resistance in the circuit between adjoining branches in parallel with each of the last mentioned condensers whereby low frequency oscillations originating in the circuit are eliminated, and a condenser between the in-put and out-put resistances and adjoining branches.

8. A filter comprising an in-put transformer, an out-put transformer, an electric circuit connecting the transformers, a plurality of parallel branches in the circuit, each branch including an inductance, a resistance and a capacity connected in series, a condenser in the circuit between adjoining branches, and a resistance in the circuit between adjoining branches in parallel with each of the last mentioned condensers whereby low frequencies originating in the circuit are eliminated.

9. A filter comprising an in-put transformer, an out-put transformer, an electric circuit connecting the transformers, a plurality of parallel branches in the circuit, each branch including an inductance, a resistance and a condenser connected in series, a resistance for each branch connected in parallel with the inductance and resistance whereby high frequency oscillations originating in the circuit are eliminated, a condenser in the circuit between adjoining branches, and a resistance in the circuit between adjoining branches in parallel with each of the last mentioned condensers whereby low frequency oscillations originating in the circuit are eliminated.

10. A filter for eliminating low frequency waves, comprising an in-put transformer, an out-put transformer, an electric circuit connecting the transformers, a plurality of parallel branches in the circuit, each branch including an inductance, a resistance and a condenser connected in series, a resistance for each branch connected in parallel with the inductance and resistance whereby high frequency oscillations originating in the circuit are eliminated, a condenser in the circuit between adjoining branches, a resistance in the circuit between adjoining branches in parallel with each of the last mentioned condensers whereby low frequency oscillations originating in the circuit are eliminated, and a condenser between the in-put and out-put transformers and adjoining branches.

11. Reflection shooting apparatus, which comprises means for transforming elastic vibrations into electric pulsations, means for filtering out undesired low frequency pulsations, means for separately damping high and low frequency oscillations originating in the filter, means for amplifying the desired high frequency oscillations, and means for recording the amplified oscillations.

12. Apparatus for filtering out low frequency waves from an electric circuit, which comprises means for passing the waves through successive stages, means for filtering out low frequency waves of different wave lengths at each stage, and means for separately damping high and low frequencies originating in the filter at each stage.

13. Apparatus for filtering out low frequency waves from an electric circuit which comprises means for passing the waves through successive stages, means for filtering out low frequency waves of successively greater wave lengths at each stage, and means separately damping high and low frequencies originating in the filter at each stage.

14. Apparatus for eliminating low frequencies, which comprises means for filtering out the low frequencies in a filter system, and means for separately damping high and low frequency oscillations originating in the system.

15. Apparatus for eliminating low frequency oscillations, which comprises means for stepping up the voltage, means for filtering out low frequencies in the system, and means for separately damping high and low frequencies originating in the system.

16. Apparatus for recording high frequency electrical pulsations due to reflected elastic earth waves, which comprises means for transforming elastic earth waves of varying frequency into electrical pulsations, means for eliminating in a filtering system undesirable low frequencies due to waves other than reflected waves, means for damping high and low frequencies originating in the mechanical and electrical systems, means for amplifying the desirable high frequencies due to the reflected waves, and means for recording the amplified frequencies.

17. In seismic prospecting in which earth vibrations of varying frequencies are produced, apparatus for recording the relatively high frequency earth waves, which comprises means for transforming the earth vibrations into their corresponding pulsations of electric energy of mixed high and low frequencies, means for passing the pulsations through successive stages of an electric system constituting an oscillatory system adapted to resonate, means for filtering out low frequency pulsations of different wave lengths at each stage, means for separately damping out high and low frequency oscillations generated in the system, means for passing the high frequency pulsations through the system, and means for recording the high frequency pulsations.

LUDWIG W. BLAU.